(12) United States Patent
Schrauf et al.

(10) Patent No.: US 10,112,370 B2
(45) Date of Patent: Oct. 30, 2018

(54) MULTILAYER SHRINK FILM MADE OF POLYESTER WITH IMPROVED PROCESSING PROPERTIES

(71) Applicant: Klöckner Pentaplast GmbH, Heiligenroth (DE)

(72) Inventors: Roland Schrauf, Neuoetting (DE); Christian Dux, Tuessling (DE); Gerhard Steuck, Eggenfelden (DE); Günther Deiringer, Kastl (DE)

(73) Assignee: Klöckner Pentaplast GmbH, Heiligenroth (DE)

( * ) Notice: Subject to any disclaimer, the term of this patent is extended or adjusted under 35 U.S.C. 154(b) by 666 days.

(21) Appl. No.: 14/499,381

(22) Filed: Sep. 29, 2014

(65) Prior Publication Data

US 2015/0104631 A1    Apr. 16, 2015

(30) Foreign Application Priority Data

Oct. 10, 2013 (DE) .......................... 10 2013 016 857

(51) Int. Cl.
  *B32B 27/32*  (2006.01)
  *B32B 27/36*  (2006.01)
  *B32B 27/08*  (2006.01)

(52) U.S. Cl.
  CPC .............. *B32B 27/36* (2013.01); *B32B 27/08* (2013.01); *B32B 2250/03* (2013.01); *B32B 2250/244* (2013.01); *B32B 2307/516* (2013.01); *B32B 2307/518* (2013.01); *B32B 2307/702* (2013.01); *B32B 2307/736* (2013.01); *B32B 2367/00* (2013.01); *Y10T 428/31786* (2015.04)

(58) Field of Classification Search
CPC . Y10T 428/31786; B32B 27/08; B32B 27/36; B32B 2250/03; B32B 2250/244; B32B 2307/516; B32B 2307/518; B32B 2307/702; B32B 2307/736; B32B 2367/00
USPC ........................................................ 428/220
See application file for complete search history.

(56) References Cited

U.S. PATENT DOCUMENTS

| 5,484,632 | A | * | 1/1996 | Mercer, Jr. ............. B32B 27/36 428/35.7 |
| 5,968,666 | A | | 10/1999 | Carter et al. |
| 6,025,069 | A | * | 2/2000 | Eckart .................... B32B 27/36 428/332 |
| 6,040,061 | A | * | 3/2000 | Bland ...................... B32B 7/02 428/480 |

(Continued)

FOREIGN PATENT DOCUMENTS

| DE | 10 2007 018 182 A1 | 10/2008 |
| EP | 1 876 019 A1 | 1/2008 |
| WO | WO 2013/056011 A1 | 4/2013 |

*Primary Examiner* — Travis M Figg
(74) *Attorney, Agent, or Firm* — ProPat, L.L.C.; Cathy R. Moore (57) ABSTRACT

A film is provided that has three layers. The inventive films are made of semicrystalline or amorphous copolyesters and further include two exterior layers and an interior layer. The exterior layers include neopentyl-glycol-modified polyethylene terephthalate, while the interior layer includes 1,4-cyclohexanedimethanol-modified polyethylene terephthalate. The inventive films advantageously provide a shrink film that has a shrink performance similar to that of shrink films made of PVC.

18 Claims, 3 Drawing Sheets

(56) References Cited

U.S. PATENT DOCUMENTS

| | | | | |
|---|---|---|---|---|
| 6,068,910 A | * | 5/2000 | Flynn | C08J 5/18 |
| | | | | 264/288.4 |
| 2002/0025444 A1 | * | 2/2002 | Hebrink | B32B 7/02 |
| | | | | 428/480 |
| 2003/0060546 A1 | * | 3/2003 | Moskala | B29C 67/24 |
| | | | | 524/284 |
| 2003/0152775 A1 | * | 8/2003 | Gorny | B32B 27/36 |
| | | | | 428/412 |
| 2004/0086690 A1 | * | 5/2004 | Hebrink | A61B 5/0803 |
| | | | | 428/156 |
| 2007/0298271 A1 | * | 12/2007 | Liu | B32B 7/12 |
| | | | | 428/480 |
| 2009/0017245 A1 | * | 1/2009 | Forloni | B29C 55/023 |
| | | | | 428/35.7 |
| 2010/0068355 A1 | * | 3/2010 | Berry | B32B 1/02 |
| | | | | 426/125 |
| 2010/0189998 A1 | * | 7/2010 | MacKerron | B29C 71/02 |
| | | | | 428/336 |
| 2012/0328849 A1 | * | 12/2012 | Neill | B32B 27/36 |
| | | | | 428/195.1 |

* cited by examiner

MULTILAYER SHRINK FILM MADE OF POLYESTER WITH IMPROVED PROCESSING PROPERTIES

CROSS-REFERENCE TO RELATED APPLICATIONS

This application claims priority to pending parent German Patent Application No. 10 2013 016 857.0, filed Oct. 10, 2013, which is hereby incorporated by reference herein in its entirety.

FIELD OF THE INVENTION

The present invention relates to a film comprising a first and second exterior layer and a third layer arranged between the first and second layer, where the first, second, and third layer is mutually independently respectively comprised of a proportion of more than 30% by weight, based on the total weight of the layer, of a first, second, and third copolyester, and optionally of one or more other polymers and additives.

BACKGROUND OF THE INVENTION

Multilayer polyester films are known in the prior art.

U.S. Pat. No. 5,484,632 describes an unoriented multilayer film comprising a first layer made of amorphous, crystallizable polyethylene terephthalate with a melting point above 238° C., and with enthalpy of fusion about 9 cal/g, and a second layer made of amorphous, heat-sealable polyester which consists essentially of monomer units of terephthalic acid, about 85-93 mol % of ethylene glycol, and about 15-7 mol % of cyclohexanedimethanol and which has enthalpy of fusion greater than 0.5 cal/g, where the thickness of the second layer is less than 50% of the total thickness of the film.

U.S. Pat. No. 5,968,666 discloses a film with at least seven layers, comprising first and third layers and also, arranged between the first and third layer, a second layer which comprises a terephthalic acid polyester and, in at least one direction, has been oriented with a degree of stretching that is higher than the degree of stretching achieved under identical stretching conditions with a monolithic film made of terephthalic acid polyester. It is preferable that the first and/or third layer comprise(s) a polyethylene naphthalate polyester.

Certain types of polyester have for some years been used to increasing extent as material for packaging films and shrink films, because the thermal and optical properties are more advantageous than those of PVC. A material that has in particular proven successful for shrink films is a semicrystalline or amorphous polyester of the EMBRACE® or EMBRACE® LV types from Eastman Chemical Company, where a CHDM glycol component is used as comonomer alongside terephthalic acid and ethylene glycol. The shrinkage performance of shrink films made of the EMBRACE® group of polyesters is approximately the same as that of shrink films made of PVC. In the case of shrink films based on the EMBRACE® group of polyesters it is possible via targeted adjustment of process parameters and/or admixture of modifiers to adapt the shrinkage curve within certain limits to the user's requirements, where the shrinkage curve describes shrinkage as a function of temperature: by way of example, a shrink film based on EMBRACE® LV can be adjusted so that its shrinkage curve is markedly flatter than that for conventional PETG-type copolyester, for example PETG 6763 from Eastman Chemical Company, and also exhibits considerably lower shrinkage stress.

In the context of large-volume industrial-scale trials using shrink labels based on the CHDM-glycol-modified polyesters, the inventors of the present application have observed a defect/reject rate amounting to a number of percentage points. Many of the shrink films based on said polyesters, and shrink labels produced therefrom cause problems during processing, or exhibit shortcomings in the printed image. A number of causes were indentified following detailed defect analysis:

blocking of the shrink film during unwinding after print pretreatment by means of corona discharge. These blocking problems lead to whitish surface cracks/markings, for which the term "blocking" or "ghosting" is used below. Blocking defects or ghosting defects remain visible after printing and moreover in unfavorable situations cause tearing of webs during unwinding;
   uncontrolled angular distortion of the film during shrinkage, for which the term "twist" or "bowing" is used below; and
   on occasion inadequate adhesion of the adhesive bond; the adhesive bond is produced when solvent is used for the adhesive bonding of the shrink film to give a tube.

It is an object of the present invention to provide a shrink film which
   consists essentially of polyester;
   has shrink performance similar to that of shrink films made of PVC; and
   in further processing has a defect rate and reject rate of less than 1%.

SUMMARY OF ADVANTAGEOUS EMBODIMENTS OF THE INVENTION

This object is achieved via a film comprising a first and second exterior layer and a third layer arranged between the first and second layer, where the first, second, and third layer is mutually independently respectively comprised of a proportion of more than 30% by weight, based on the total weight of the layer, of a first, second, and third copolyester, and optionally of one or more other polymers and additives, and
   the first copolyester is comprised of diacid moieties and of diol moieties, at least 80 mol % of the diacid moieties are terephthalic acid moieties, and the diol moieties comprise from 70 to 95 mol % of ethylene glycol moieties and from 5 to 20 mol % of neopentyl glycol (NPG) moieties;
   the second copolyester is comprised of diacid moieties and of diol moieties, at least 80 mol % of the diacid moieties are terephthalic acid moieties, and the diol moieties comprise from 70 to 95 mol % of ethylene glycol moieties and from 5 to 20 mol % of neopentyl glycol (NPG) moieties; and
   the third copolyester is comprised of diacid moieties and of diol moieties, at least 80 mol % of the diacid moieties are terephthalic acid moieties, and the diol moieties comprise from 60 to 90 mol % of ethylene glycol moieties and from 10 to 35 mol % of 1,4-cyclohexanedimethanol (CHDM) moieties.

DETAILED DESCRIPTION OF ADVANTAGEOUS EMBODIMENTS OF THE INVENTION

Figure 4:
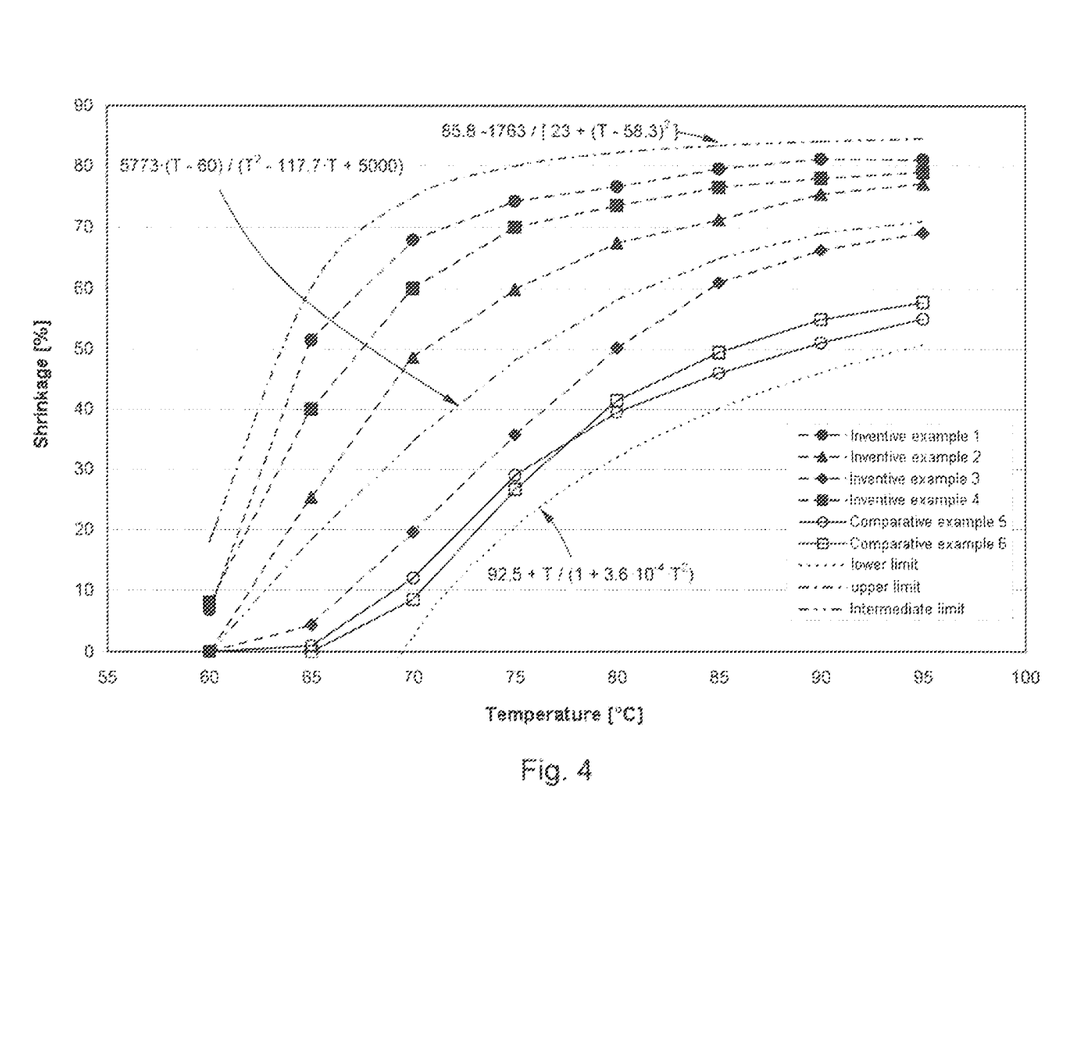
FIG. 4 is a graphical illustration of temperature shrinkage curves for various inventive and comparative films.

In advantageous embodiments of the film of the invention:
- the proportion of the first copolyester in the first layer, the proportion of the second copolyester in the second layer, and the proportion of the third copolyester in the third layer is mutually independently more than 50% by weight, based on the total weight of the respective layer;
- the proportion of the first copolyester in the first layer, the proportion of the second copolyester in the second layer, and the proportion of the third copolyester in the third layer is mutually independently more than 70% by weight, based on the total weight of the respective layer;
- the diol moieties of the first copolyester comprise a proportion of from 10 to 20 mol % of neopentyl glycol (NPG) moieties;
- the first copolyester is semicrystalline or amorphous and has a crystallization half-life time of at least 5 minutes in the molten state;
- the diol moieties of the second copolyester comprise a proportion of from 10 to 20 mol % of neopentyl glycol (NPG) moieties;
- the second copolyester is semicrystalline or amorphous and has a crystallization half-life time of at least 5 minutes in the molten state;
- the diol moieties of the third copolyester comprise from 15 to 25 mol % of 1,4-cyclohexanedimethanol (CHDM) moieties;
- the third copolyester is semicrystalline or amorphous and has a crystallization half-life time of at least 5 minutes in the molten state;
- the total thickness of the film after monoaxial orientation with a degree of stretching of from 1.3 to 6 is from 20 to 150 μm;
- the thickness of the third layer is from 40 to 94% of the total thickness of the film;
- the thickness of the third layer is from 60 to 94% of the total thickness of the film;
- the thickness of the third layer is from 70 to 94% of the total thickness of the film;
- the thickness of the third layer is from 80 to 94% of the total thickness of the film;
- the film has been monoaxially or biaxially oriented with a degree of stretching of from 1.3 to 6, and at a temperature of 75° C. shrinks in the direction of stretching by from 20 to 80%, this measurement being made after 30 seconds of shrinkage in water;
- the film has been monoaxially or biaxially oriented with a degree of stretching of from 1.3 to 6, and at a temperature of 95° C. shrinks in the direction of stretching by from 50 to 85%, this measurement being made after 30 seconds of shrinkage in water;
- the film has been monoaxially or biaxially oriented with a degree of stretching of from 1.3 to 6, and at a temperature of 95° C. exhibits a shrinkage stress of less than 12 MPa (N/mm$^2$);
- the film has been monoaxially or biaxially oriented with a degree of stretching of from 1.3 to 6, and at a temperature of 95° C. exhibits a shrinkage stress of less than 8.5 MPa (N/mm$^2$);
- the film has been monoaxially or biaxially oriented with a degree of stretching of from 1.3 to 6, and in at least one stretching direction exhibits a temperature-shrinkage curve S(T) where $$92.5+T/(1+3.6\cdot10^{-4}\cdot T^2)<S(T)<85.8-1763/[23+(T-58.3)^2]$$

where S(T) denotes the shrinkage in percent (measured after 30 seconds of shrinkage in water) and T the temperature in the unit ° C. (see FIG. 4);
- the film has been monoaxially or biaxially oriented with a degree of stretching of from 1.3 to 6, and in at least one stretching direction exhibits a temperature-shrinkage curve S(T) where $$92.5+T/(1+3.6\cdot10^{-4}\cdot T^2)<S(T)<5773\cdot(T-60)/(T^2-117.7\cdot T+5000)$$

where S(T) denotes the shrinkage in percent (measured after 30 seconds of shrinkage in water) and T the temperature in the unit ° C. (see FIG. 4);
- the film has been monoaxially or biaxially oriented with a degree of stretching of from 1.3 to 6, and in at least one stretching direction exhibits a temperature-shrinkage curve S(T) where $$5773\cdot(T-60)/(T^2-117.7\cdot T+5000)<S(T)<85.8-1763/[23+(T-58.3)]$$

where S(T) denotes the shrinkage in percent (measured after 30 seconds of shrinkage in water) and T the temperature in the unit ° C. (see FIG. 4);
- free shrinkage of the film in a waterbath using a temperature of 95° C. and 15 seconds of shrink time gives a twist angle less than 17 degrees, preferably less than 15 degrees, and in particular less than 13 degrees, where the twist angle is measured by the method described below;
- in unoriented and oriented condition, the film has a coefficient of static friction with respect to itself of less than 0.7 measured in accordance with DIN EN ISO 8295, and a coefficient of sliding friction with respect to itself, measured in accordance with DIN EN ISO 8295, of less than 0.6; and/or
- the film has been treated by means of corona discharge on one or both sides.

In advantageous embodiments the film of the invention is moreover characterized in that:
- the proportion of the first copolyester in the first layer is more than 80% by weight, based on the total weight of the first layer;
- the proportion of the first copolyester in the first layer is more than 90% by weight, based on the total weight of the first layer;
- the first layer comprises a copolyester comprised of diacid moieties and diol moieties, where at least 80 mol % of the diacid moieties are terephthalic acid moieties, and the diol moieties comprise from 60 to 90 mol % of ethylene glycol moieties and from 10 to 35 mol % of 1,4-cyclohexanedimethanol (CHDM) moieties;

the proportion of the second copolyester in the second layer is more than 80% by weight, based on the total weight of the second layer;

the proportion of the second copolyester in the second layer is more than 90% by weight, based on the total weight of the second layer;

the second layer comprises a copolyester comprised of diacid moieties and diol moieties, where at least 80 mol % of the diacid moieties are terephthalic acid moieties, and the diol moieties comprise from 60 to 90 mol % of ethylene glycol moieties and from 10 to 35 mol % of 1,4-cyclohexanedimethanol (CHDM) moieties;

the proportion of the third copolyester in the third layer is more than 80% by weight, based on the total weight of the third layer;

the proportion of the third copolyester in the third layer is more than 90% by weight, based on the total weight of the third layer;

the third layer comprises a copolyester comprised of diacid moieties and of diol moieties, where at least 80 mol % of the diacid moieties are terephthalic acid moieties, and the diol moieties comprise from 70 to 95 mol % of ethylene glycol moieties and from 5 to 20 mol % of neopentyl glycol (NPG) moieties;

the first, second, and/or third layer comprise(s) one or more additives selected from the group consisting of modifiers, UV absorbers, and color pigments;

the first and/or the second layer comprise(s) one or more organic and/or inorganic antiblocking agents, such as waxes, oils, silicate particles, or talc;

between the first and third layer there is an adhesive layer arranged;

between the second and third layer there is an adhesive layer arranged;

the thickness of the film in unoriented condition is from 50 to 1200 µm;

the film has been oriented with a degree of stretching of from 1.3 to 5;

in oriented condition with a degree of stretching of from 1.3 to 5, the thickness of the film is from 20 to 500 µm; and/or in oriented condition with a degree of stretching of from 1.3 to 5, the thickness of the film is from 20 to 200 µm.

For the purposes of the present invention, the data for the shrinkage S [%] in the unit percent describe the difference between the length of the film in the respective shrinkage or stretching direction prior to shrinkage and after shrinkage, based on the length prior to shrinkage:

$$S[\%] = \frac{\text{length prior to shrinkage} - \text{length after shrinkage}}{\text{length prior to shrinkage}}$$

The inventors have observed that the nature of the glycol modification of the semicrystalline or amorphous copolyesters used influences the properties of the resultant shrink films to a considerable extent. Shrink films made of NPG-modified copolyester differ from shrink films made of CHDM-modified copolyester by virtue of the following properties:

no blocking after corona pretreatment;
reduced twist or bowing;
good capability for adhesive bonding with solvents;
high shrinkage stress;
steep shrinkage curve, with very little susceptibility to process-technique-related influences.

Surprisingly, the inventors have succeeded in providing a shrink film which combines the advantageous properties of CHDM- and NPG-modified copolyesters, while substantially avoiding the respective disadvantageous properties.

Figure 1:
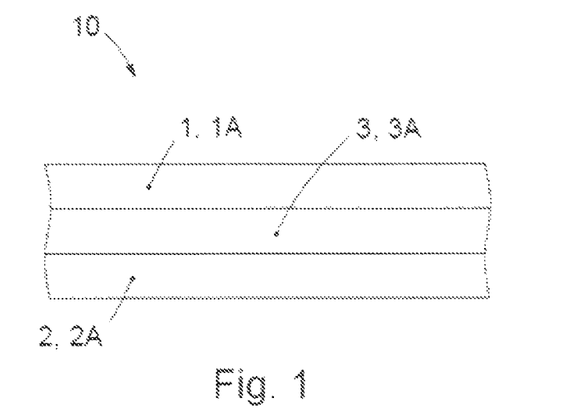
FIG. 1 is a cross sectional schematic of an exemplary inventive film.

FIG. 1 is a diagram of a cross section of a film 10 of the invention with a first, second, and third layer 1, 2, and 3, where the third layer 3 is arranged between the first and second layer 1 and 2. Each of the three layers 1, 2, and 3 is comprised of a material which comprises, mutually independently, a neopentyl-glycol-modified copolyester 1A, 2A and, respectively, a 1,4-cyclohexanedimethanol-modified copolyester 3A, where the proportion of the copolyester 1A, 2A and, respectively, 3A is more than 30% by weight, preferably more than 50% by weight, and in particular more than 70% by weight, based on the total weight of the layer 1, 2 and, respectively, 3.

The film 10 of the invention is preferably produced by coextrusion with use of a known film plant with from two to five extruders, the polymer melts discharged from which are mutually superposed by flow through a feedblock, and shaped by way of a flat-film die onto a chill roll to give a flat multilayer film. In one advantageous embodiment of the invention a three-layer film 10 is produced where a first and second layer (1, 2) of the film 10 are comprised of the same, neopentyl-glycol-modified copolyester (1A=2A). Accordingly, a film plant is used with an extruder E1 for the copolyester (1A=2A) of the first and second layer (1, 2) and with another extruder E2 for the 1,4-cyclo-hexanedimethanol-modified copolyester (3A) of the third layer 3.

Figure 2:
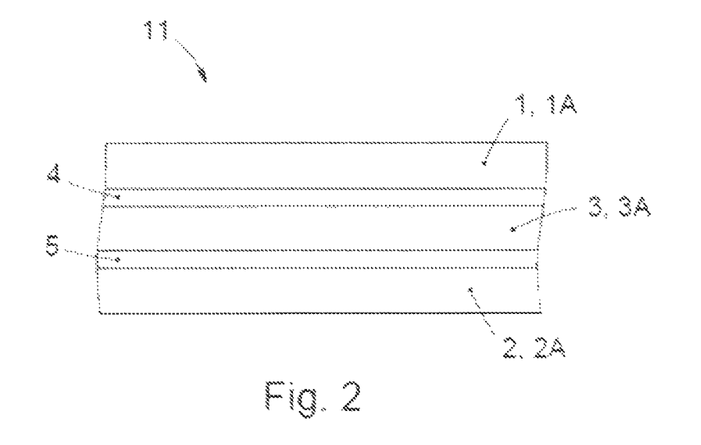
FIG. 2 is a cross sectional schematic of an alternative exemplary inventive film.

FIG. 2 is a diagram of a cross section of a further film 11 of the invention with a first, second, and third layer 1, 2, and 3, where a first intermediate layer 4 is arranged between the first layer 1 and the third layer 3, and a second intermediate layer 5 is arranged between the second layer 2 and the third layer 3. Each of the three layers 1, 2, and 3 is comprised of a material which comprises, mutually independently, a neopentyl-glycol-modified copolyester 1A, 2A and, respectively, a 1,4-cyclohexanedimethanol-modified copolyester 3A, where the proportion of the copolyester 1A, 2A and, respectively, 3A is more than 30% by weight, preferably more than 50% by weight, and in particular more than 70% by weight, based on the total weight of the layer 1, 2 and, respectively, 3. The first and second intermediate layer 4 and 5 are preferably comprised of an adhesion-promoting substance, for example an ethylene-vinyl acetate copolymer.

Test Methods

The crystallization half-life time of the copolyester 3A used in the third layer 3, and also of the copolyesters 1A and 2A used in the first and second layer 1, 2, is determined with the aid of a differential scanning calorimeter or DSC. Differential scanning calorimetry (DSC) is a standard method for the measurement of thermal properties, in particular of phase transition temperatures of solids. The method used in the present invention to determine the crystallization half-life time is as follows: 15 mg of the copolyester 3A are heated to 290° C., and then cooled at a rate of 320° C. per minute in the presence of helium to a prescribed temperature of from 180 to 210° C., and the time required to reach the isothermal crystallization temperature or the crystallization peak of the DSC curve is detected. The crystallization half-life time is determined by observing the progress of crystallization as a function of time. The crystallization half lifetime is the time required to obtain 50% of the maximum achievable crystallinity in the sample at the prescribed temperature of from 180 to 210° C. after the initial crystallization phase.

For the purposes of the present invention, the coefficient of static and sliding friction of a film is determined in accordance with DIN EN ISO 8295 by using a Z010 device from Zwick Roell. The test conditions are:
Friction table=200 mm×400 mm
Sled material=Aluminum
Mass of sled=200 g (=1.96 N)
Contact area of sled=50 mm×80 mm
Velocity of sled=100 mm/min
Humidity=50% r.h.

The thickness is determined by a method based on DIN 53370 by using a 543/250 B device from Mitutoyo, Japan. The point measurements were obtained by placing the film between the open measurement surfaces of the device, which were then gently closed. The thickness was read from the device.

The proportion of thickness made up by the first, second, and third layer 1, 2, and 3, based on the total thickness of a film of the invention, was determined by using a microtome and applying liquid nitrogen to cut small test sections from the respective film and using an FTIR microscope or a scanning electron microscope to produce images of the cut edges. The boundary between the layers 1 and 3, and also 2 and 3, is clearly discernible in the FTIR micrographs, and the relative proportion of thickness made up by each layer can therefore be determined reliably. In an alternative to this, color pigments were added during the production of the film of the invention to the material of the third layer 3 or, if desired, to the material of the first and second layer 1, 2, and the thickness of, or the proportion of thickness made up by, the layers 1, 2, 3 was determined at cut edges of the resultant film by using a simple optical microscope.

Shrinkage is measured in accordance with DIN 53377. For this, the film is placed for 30 s in a waterbath at a prescribed temperature of 60, 65, 70, 75, 80, 85, 90, and 95° C. The dimensional change occurring after this time is measured at room temperature.

Shrinkage stress is measured in accordance with DIN 53369 by using a RETRATECH® device from Artec Testnology.

Figure 3:
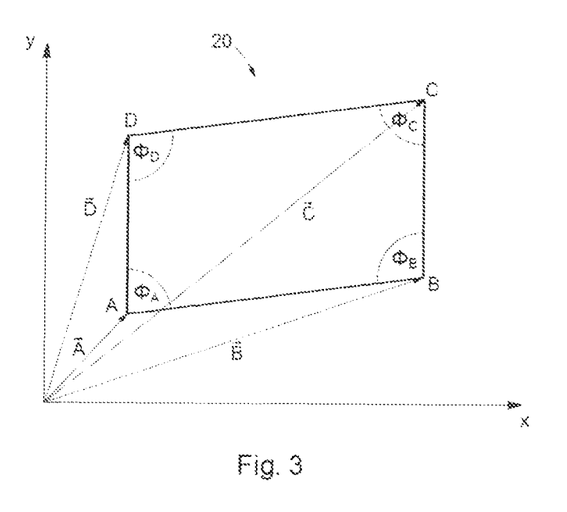
FIG. 3 is a schematic depiction of an exemplary specimen used to determine the twist angle ΔΦ after shrinkage of the film.

The twist angle or bowing angle is measured by cutting ten or more film specimens, in each case in the form of a rectangle measuring 150 mm in the direction of orientation and 100 mm perpendicularly to the direction of orientation, from a film oriented monoaxially in machine direction (MD) or transversely to machine direction (TD). By way of example, the dimensions of a film specimen cut from a film oriented transversely to machine direction (TD) are 150 mm in TD and 100 mm in MD. The film specimens are subjected to "free shrinkage" in a waterbath at a temperature of 95° C. The residence time in the waterbath, or the shrinkage time, is 15 seconds. The expression "free shrinkage" here describes the situation where the film specimen is not mechanically fixed in the waterbath and can move freely. The film specimen is measured after removal from the waterbath to determine any distortion, or twist angle or bowing angle $\Delta\Phi$. The twist angle or bowing angle $\Delta\Phi$ describes the deviation from 90 degrees of the angle between an edge of the film specimen in the direction of orientation and an edge of the film specimen in the direction not subjected to orientation. FIG. 3 depicts the determination of the twist angle $\Delta\Phi$ after shrinkage of a film specimen from a film oriented in TD, where the edges AD and BC are parallel to the direction of shrinkage or direction of stretching. After free shrinkage in water at 95° C. for 15 seconds, the film specimen is laid flat on a metal plate with an engraved millimeter grid, one of the two film-specimen edges running in the direction of shrinkage or the direction of stretching is directed parallel to the x- or y-axis of the engraved metal grid, and the position of, or the Cartesian coordinates of, the four corners A, B, C, D of the film specimen is/are determined, the arrangement of the four corners here being, in accordance with the usual mathematical convention, anti-clockwise around the periphery of the film specimen. The angle $\Phi_A$, $\Phi_B$, $\Phi_C$, $\Phi_D$ included at each of the corners A, B, C, D of the edges of the film specimen is then calculated from the following relationships:

$$\Phi_A = \cos^{-1}\left\{\frac{(\vec{D}-\vec{A})\cdot(\vec{B}-\vec{A})}{|\vec{D}-\vec{A}|\cdot|\vec{B}-\vec{A}|}\right\}$$

$$\Phi_B = \cos^{-1}\left\{\frac{(\vec{A}-\vec{B})\cdot(\vec{C}-\vec{B})}{|\vec{A}-\vec{B}|\cdot|\vec{C}-\vec{B}|}\right\}$$

$$\Phi_C = \cos^{-1}\left\{\frac{(\vec{D}-\vec{C})\cdot(\vec{B}-\vec{C})}{|\vec{D}-\vec{C}|\cdot|\vec{B}-\vec{C}|}\right\}$$

$$\Phi_D = \cos^{-1}\left\{\frac{(\vec{A}-\vec{D})\cdot(\vec{C}-\vec{D})}{|\vec{A}-\vec{D}|\cdot|\vec{C}-\vec{D}|}\right\}$$

Where
$\vec{A}=(x_A, y_A)$
$\vec{B}=(x_B, y_B)$
$\vec{C}=(x_C, y_C)$
$\vec{D}=(x_D, y_D)$
where $(x_A, y_A)$, $(x_B, y_B)$, $(x_C, y_C)$, $(x_D, y_D)$ are the Cartesian coordinates, and
$\vec{A}, \vec{B}, \vec{C}, \vec{D}$
are the two-dimensional position vectors of the corner points A, B, C, D. The product of two vectors, and the length, or the magnitude, of a vector, are calculated in a known manner from the relationships $$\vec{A}\cdot\vec{B}=x_A x_B + y_A y_B$$

$$|\vec{A}|=\sqrt{x_A^2+y_A^2}$$

Finally, the twist angle $\Delta\Phi$ is determined by taking the mean of the respective deviations of the corner angles $\Phi_A$, $\Phi_B$, $\Phi_C$, $\Phi_D$ from 90°, from the formula $$\Delta\Phi=\{|\Phi_A-90°|+|\Phi_B-90°|+|\Phi_C-90°|+|\Phi_D-90°|\}/4.$$

EXAMPLES

Four films of the invention (described below as inventive Examples 1, 2, 3, and 4) and two comparative films (described below as comparative Examples 5 and 6) of the prior art, with length in each case from 2000 to 3000 m, were produced as described above by coextrusion on a known film plant with transverse stretching unit (TD). The width of the films after orientation was from 4.0 to 5 m. Table 1 gives the essential parameters and properties of the films of inventive Examples 1, 2, 3, 4 and comparative Examples 5 and 6. FIG. 4 is a graph showing the temperature-shrinkage curve S(T) of each film, measured in accordance with DIN 53377.

The first 1000 m of each of the experimental films were removed or classified as recycling material. From the next 1000 m, a number of narrow film webs of width 300 mm and length about 1000 m were cut, in each case from a central region between the longitudinal edges of the film web, and wound up onto conventional mandrels, and also onto specifically prepared "blocking/ghosting mandrels".

The "blocking/ghosting mandrels" are comprised of a conventional paperboard or plastics mandrel equipped with a protruding area running around the entire circumference at a position arranged approximately centrally with respect to the film web. By way of example, a protruding area is produced with thickness from 2 to 5 mm, based on the radius of the mandrel, and with width about 20 mm in the axial direction of the mandrel by winding an adhesive tape a number of times around the mandrel. The protruding area of the blocking/ghosting mandrels produces, in the film webs wound onto these, a region where there is more pressure between adjacent film layers than in the simply cylindrical regions of the mandrel. The film webs wounds onto ghosting mandrels were stored for 5 days and then unwound and inspected visually for blocking defects or ghosting defects. In the case of the film webs produced in the invention in Examples 1, 2, 3, and 4 there were no detectable blocking/ghosting defects. In contrast, the film webs of comparative Examples 5 and 6 exhibited, at the position of the protruding area, about 4 to 12 blocking/ghosting defects per 100 m of length.

The film webs wound up onto conventional mandrels were subjected to a corona treatment on one side, and again wound up, the corona-treated side here forming the internal wound side. A digital printer was then used to print a multicolor geometric linear pattern onto the corona-treated side and, in a finishing unit, the film web was edge-trimmed, folded, and adhesively-bonded by using solvent to give a tube in such a way that the printed side formed the internal side of the tube. The shrink film tubes thus obtained were introduced into a labeling plant with downstream heating tunnel, and shrink labels were provided to water-filled profiled PET bottles of diameter up to 80 mm. The length of the shrink labels in the direction of the axis of the bottle was 130 mm. For each of inventive Examples 1, 2, 3, and 4, and comparative Examples 5 and 6, 10 000 bottles were provided with shrink labels made of the corresponding film, and these were checked for defects in the printed image and in the adhesive bond by using a GEMINI® 3D fully automatic optical inspection system from Emhart Glass SA with throughput of 200 bottles per minute.

That which is claimed:

1. A shrink film comprising a first and second exterior layer and a third layer arranged between the first and second layer, where the first layer comprises a first copolyester, the second layer comprises a second copolyester, and the third layer comprises a third copolyester, wherein each layer independently comprises more than 30% by weight of the first, second, and third copolyesters, respectively, based on the total weight of each layer, and optionally of one or more other polymers and additives, wherein the first copolyester is comprised of diacid moieties and of diol moieties, at least 80 mol % of the diacid moieties are terephthalic acid moieties, and the diol moieties comprise from 70 to 90 mol % of ethylene glycol moieties and from 5 to 20 mol % of neopentyl glycol moieties;

the second copolyester is comprised of diacid moieties and of diol moieties, at least 80 mol % of the diacid moieties are terephthalic acid moieties, and the diol moieties comprise from 70 to 90 mol % of ethylene glycol moieties and from 5 to 20 mol % of neopentyl glycol moieties;

the third copolyester is comprised of diacid moieties and of diol moieties, at least 80 mol % of the diacid moieties are terephthalic acid moieties, and the diol moieties comprise from 60 to 90 mol % of ethylene glycol moieties and from 10 to 35 mol % of 1,4-cyclohexanedimethanol moieties, and the film has a degree of monoaxial or biaxial stretching of from 1.3 to 6 and shrinks in the direction of stretching by from 20 to 80% at a temperature of 75° C., as measured in accordance with DIN 53377.

2. The film as claimed in claim 1, wherein the first layer, the second layer, and the third layer each independently

TABLE 1

| Parameter | Inv. Ex. 1 | Inv. Ex. 2 | Inv. Ex. 3 | Inv. Ex. 4 | Comp. Ex. 5 | Comp. Ex. 6 |
|---|---|---|---|---|---|---|
| Layer 1: propn. of thickness | 20% | 10% | 5% | 10% | 10% | 10% |
| Layer 2: propn. of thickness | 20% | 10% | 5% | 10% | 10% | 10% |
| Layer 3: propn. of thickness | 60% | 80% | 90% | 80% | 80% | 80% |
| Copolyester type 1A | 10 mol % NPG[1] | 10 mol % NPG[1] | 15 mol % NPG[1] | 10 mol % NPG[1] | 18 mol % CHDM[2] | 20 mol % CHDM[2] |
| Copolyester type 2A | 10 mol % NPG[1] | 10 mol % NPG[1] | 15 mol % NPG[1] | 10 mol % NPG[1] | 18 mol % CHDM[2] | 20 mol % CHDM[2] |
| Copolyester type 3A | 20 mol % CHDM[2] | 20 mol % CHDM[2] | 20 mol % CHDM[2] | 20 mol % CHDM[2] | 18 mol % CHDM[2] | 20 mol % CHDM[2] |
| Propn. of copolyester 1A[3] | 85% by wt. | 85% by wt. | 85% by wt. | 98% by wt. | 98% by wt. | 98% by wt. |
| Propn. of copolyester 2A[3] | 85% by wt. | 85% by wt. | 85% by wt. | 98% by wt. | 98% by wt. | 98% by wt. |
| Propn. of copolyester 3A[4] | 96% by wt. | 98% by wt. | 9 6% by wt. | 98% by wt. | 100% by wt. | 96% by wt. |
| Film stretching temperature | 85° C. | 85° C. | 85° C. | 85° C. | 90° C. | 85° C. |
| Degree of transverse stretching (TD) | 5 | 5 | 5 | 5 | 5 | 5 |
| Degree of longitudinal stretching (MD) | — | — | — | — | — | — |
| Total thickness after orientation | 50 μm | 50 μm | 50 μm | 50 μm | 75 μm | 50 μm |
| Shrinkage stress | 8.2 MPa | 7.4 MPa | 6.5 MPa | 8.6 MPa | 9.1 MPa | 6.0 MPa |
| Coefficient of static friction | 0.50 | 0.28 | 0.40 | 0.36 | 0.75 | 0.78 |
| Coefficient of sliding friction | 0.38 | 0.45 | 0.28 | 0.23 | 0.65 | 0.63 |
| Blocking after corona treatment | no | no | slight | no | yes | yes |
| Twist angle | 11.5° | 15.5° | 16.2° | 12.3° | 17.5° | 20.5° |
| Defect rate | 0.4% | 0.7% | 0.9% | 0.6% | 2.2% | 2.4% |

[1] NPG = neopentyl glycol;
[2] CHDM = 1,4-cyclohexanedimethanol;
[3] the first and second exterior layer respectively comprise a proportion of about 2% by weight of an organic or inorganic antiblock additive, and also optionally up to 13% by weight of copolyester of type 3A, based on the total weight of the layer;
[4] the interior third layer comprises a proportion of up to 4% by weight of UV absorbers and/or color pigments, based on the total weight of the third layer.

comprises more than 50% by weight of the respective copolyesters, based on the total weight of the respective layer.

3. The film as claimed in claim 1, wherein the diol moieties of the third copolyester comprise from 15 to 25 mol % of 1,4-cyclohexanedimethanol moieties.

4. The film as claimed in claim 1, wherein the first and second copolyester are semicrystalline or amorphous and have a crystallization half-life time in the molten state of at least 5 minutes.

5. The film as claimed in claim 1, wherein the diol moieties of the first copolyester comprise a proportion of from 10 to 20 mol % of neopentyl glycol moieties.

6. The film as claimed in claim 1, wherein the diol moieties of the second copolyester comprise a proportion of from 10 to 20 mol % of neopentyl glycol moieties.

7. The film as claimed in claim 1, wherein the total thickness of the film after monoaxial orientation with a degree of stretching of from 1.3 to 6 is from 20 to 150 μm.

8. The film as claimed in claim 1, wherein the thickness of the third layer is from 40 to 94% of the total thickness of the film.

9. The film as claimed in claim 1, wherein the thickness of the third layer is from 60 to 94% of the total thickness of the film.

10. The film as claimed in claim 1, wherein the film has been monoaxially or biaxially oriented with a degree of stretching of from 1.3 to 6, and at a temperature of 95° C. shrinks in the direction of stretching by from 50 to 85%, as measured in accordance with DIN 53377.

11. The film as claimed in claim 1, wherein the film has been monoaxially or biaxially oriented with a degree of stretching of from 1.3 to 6, and at a temperature of 95° C. exhibits a shrinkage stress of less than 12 MPa.

12. The film as claimed in claim 1, wherein the film has been monoaxially or biaxially oriented with a degree of stretching of from 1.3 to 6, and at a temperature of 95° C. exhibits a shrinkage stress of less than 8.5 MPa.

13. The film as claimed in claim 1, wherein the film has been monoaxially or biaxially oriented with a degree of stretching of from 1.3 to 6, and in at least one stretching direction exhibits a temperature-shrinkage curve S(T) where $$92.5 + T/(1 + 3.6 \cdot 10^{-4} \cdot T) < S(T) < 85.8 - 1763/[23 + (T - 58.3)^2]$$

where S(T) denotes the shrinkage in percent and T the temperature in the unit ° C.

14. The film as claimed in claim 1, wherein, in unoriented and oriented condition, the film has a coefficient of static friction with respect to itself of less than 0.7 measured in accordance with DIN EN ISO 8295, and a coefficient of sliding friction with respect to itself, measured in accordance with DIN EN ISO 8295, of less than 0.6.

15. The film as claimed in claim 1, wherein the film has been treated by means of corona discharge on one or both sides.

16. The film as claimed in claim 1, wherein the diacid moieties within the first, second and third copolyester consist of terephthalic acid moieties and the third copolyester diol moieties are comprised of from 18 to 35 mol % of 1,4-cyclohexanedimethanol moieties.

17. The film as claimed in claim 1, wherein said film is a tri-layered film.

18. The film as claimed in claim 1, wherein the diacid of the first and copolyester consists of terephthalic acid moieties, and the diol moieties comprise from 15 to 20 mol % of neopentyl glycol moieties.

* * * * *